United States Patent [19]

Burdette et al.

[11] Patent Number: 4,659,295

[45] Date of Patent: Apr. 21, 1987

[54] GAS SEAL VANES OF VARIABLE NOZZLE TURBINE

[75] Inventors: Fred E. Burdette, Torrance; Jean-Luc Fleury; Manfred Roessler, both of Manhattan Beach, all of Calif.

[73] Assignee: The Garrett Corporation, Los Angeles, Calif.

[21] Appl. No.: 602,644

[22] Filed: Apr. 20, 1984

[51] Int. Cl.[4] .................. F01D 17/12; F02B 37/12
[52] U.S. Cl. ................................ 417/407; 415/164
[58] Field of Search ............ 60/602; 415/163, 164, 415/165; 417/407

[56] References Cited

U.S. PATENT DOCUMENTS

| | | | |
|---|---|---|---|
| 2,428,830 | 10/1947 | Birmann | 415/164 X |
| 2,860,827 | 11/1958 | Egli | 417/407 |
| 2,976,013 | 3/1961 | Hunter | 415/163 X |
| 3,033,519 | 5/1962 | Radtke | 415/164 |
| 3,101,926 | 8/1963 | Weber | 415/164 |
| 3,112,096 | 11/1963 | Lazo et al. | |
| 3,318,513 | 5/1967 | Johnson | |
| 3,542,484 | 11/1970 | Mason | |
| 3,645,645 | 2/1972 | Gamill et al. | 415/163 |
| 3,999,883 | 12/1976 | Nordenson | |
| 4,025,227 | 5/1977 | Greenberg et al. | |
| 4,150,915 | 4/1979 | Karstensen | |
| 4,179,247 | 12/1979 | Osborn | 415/163 X |
| 4,353,685 | 10/1982 | Osborn et al. | |
| 4,363,600 | 12/1982 | Thebert | |

FOREIGN PATENT DOCUMENTS

| 861630 | 2/1961 | United Kingdom | 415/163 |
|---|---|---|---|
| 715812 | 2/1980 | U.S.S.R. | 415/164 |

OTHER PUBLICATIONS

"Turbocharging for Better Vehicle Engines", W. T. Von der Nuell, SAE Paper No. 631A, 5/1963.

Primary Examiner—Michael Koczo
Attorney, Agent, or Firm—J. H. Muetterties; A. J. Miller

[57] ABSTRACT

A turbocharger having a variable nozzle vane assembly to be used in association with an engine. A nozzle ring having a plurality of rotatable vanes mounted thereto defining an annular passageway within the turbine housing through which exhaust gas passes upstream of a turbine. Included is a means for rotating the plurality of vanes and a means for preventing binding of the components during thermal cycling.

26 Claims, 10 Drawing Figures

GAS SEAL VANES OF VARIABLE NOZZLE TURBINE

BACKGROUND OF THE INVENTION

The present invention relates to turbomachinery and more particular to a variable nozzle vane assembly upstream of the turbine.

In turbomachinery in which the turbine is intended to drive a compressor or the like, it is often desirable to control the flow of motive gas to the turbine to improve its efficiency or operational range. In order to accomplish this, the nozzle passageways leading to the turbine wheel may be of variable geometry. These variable geometry nozzle passages can be provided by means of a plurality of vanes which are pivotable so as to alter the configuration of the passages therebetween. However, with these pivotable vanes it is necessary to adequately seal the free ends of the vanes so as to avoid leakage of exhaust gas around the tips of the vanes. The leakage problem is particularly acute in high temperature engines where the relative radial displacement due to the thermal expansion is excessive between the inner shroud and the vane tips. Furthermore, sealing the van tips against leakage must be accomplished in such a manner as to avoid binding of the vanes within the passageway.

Several different approaches have been taken in an attempt to provide an effective seal at the tips of the turbine nozzle vanes. One approach had been to springload the nozzle ring so that the vanes are always firmly held against the opposing wall, U.S. Pat. No. 3,112,096. Another approach involves the use of the pressure of the exhaust gas to load a pressure plate located within the outer shroud wall, against the vane tips, see U.S. Pat. No. 3,033,519. A third approach has been to allow exhaust gas pressure to force blades internal to the vane to extend from the vane in order to seal off any leakage pressure around the vane, see U.S. Pat. No. 3,101,926.

SUMMARY OF THE INVENTION

In accordance with the present invention, rotatable guide vanes are mounted to a nozzle ring which is spring loaded against the turbine housing within an annular nozzle passageway. The spring loaded nozzle ring is responsive to the increased gas pressure within the passageway during periods of high temperature operation and the associated thermal expansion of the vanes in the axial direction. In this manner the vanes remain rotatable and avoid binding within the nozzle passageway. Furthermore, spacers having an axial length slightly longer than the axial length of the vanes can be used to ensure that binding does not occur during periods of greatest thermal expansion. In this manner the vanes are free to pivot in response to engine operating conditions.

In addition, a means for rotating the plurality of vanes, in the form of a unison ring, is provided within the turbocharger housing. Each vane has a vane arm associated therewith which connects the vanes to the unison ring such that rotation of the unison ring causes pivoting of the vanes. Thermal cycling, with attendant thermal growth of the structure, can also cause misalignment of the unison ring with respect to the vane arms thereby causing binding of the arms within the unison ring or binding of the unison ring within the turbocharger housing preventing rotation of the vanes. A structure is provided which accommodates such thermal growth and therefore prevents any misalignment of the unison ring.

DETAILED DESCRIPTION OF THE INVENTION

Figure 3:
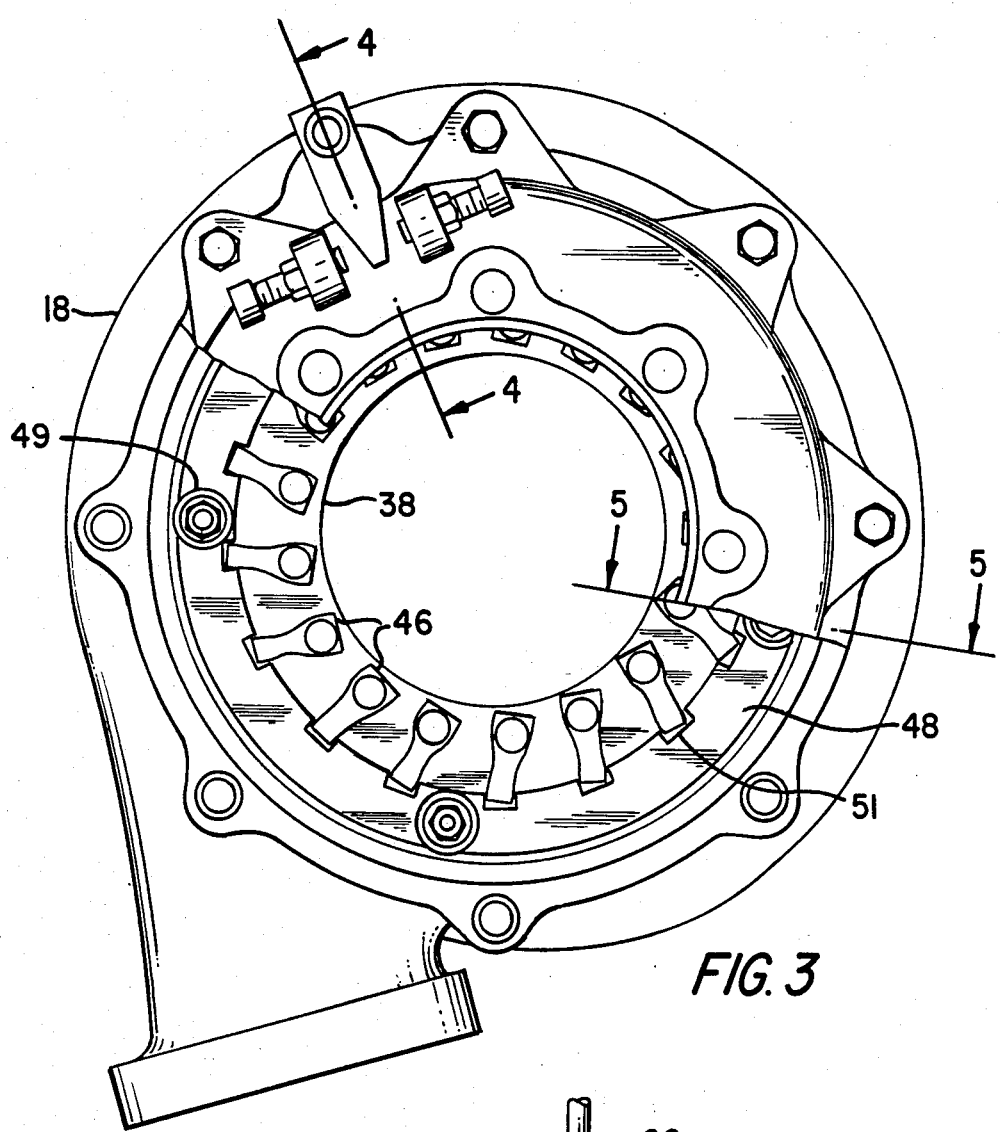
FIG. 3 is a sectional view of the turbine end of the turbocharger which includes the present invention.
Figure 1:
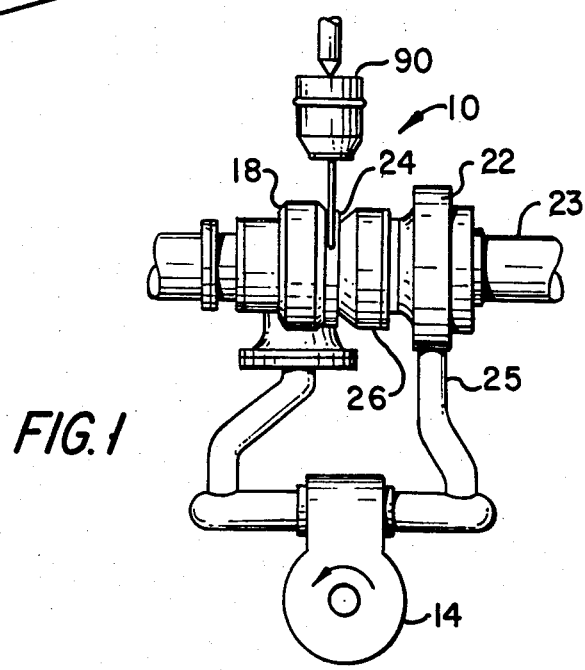
FIG. 1 is a diagramic view illustrating a turbocharged engine system.
Figure 2:
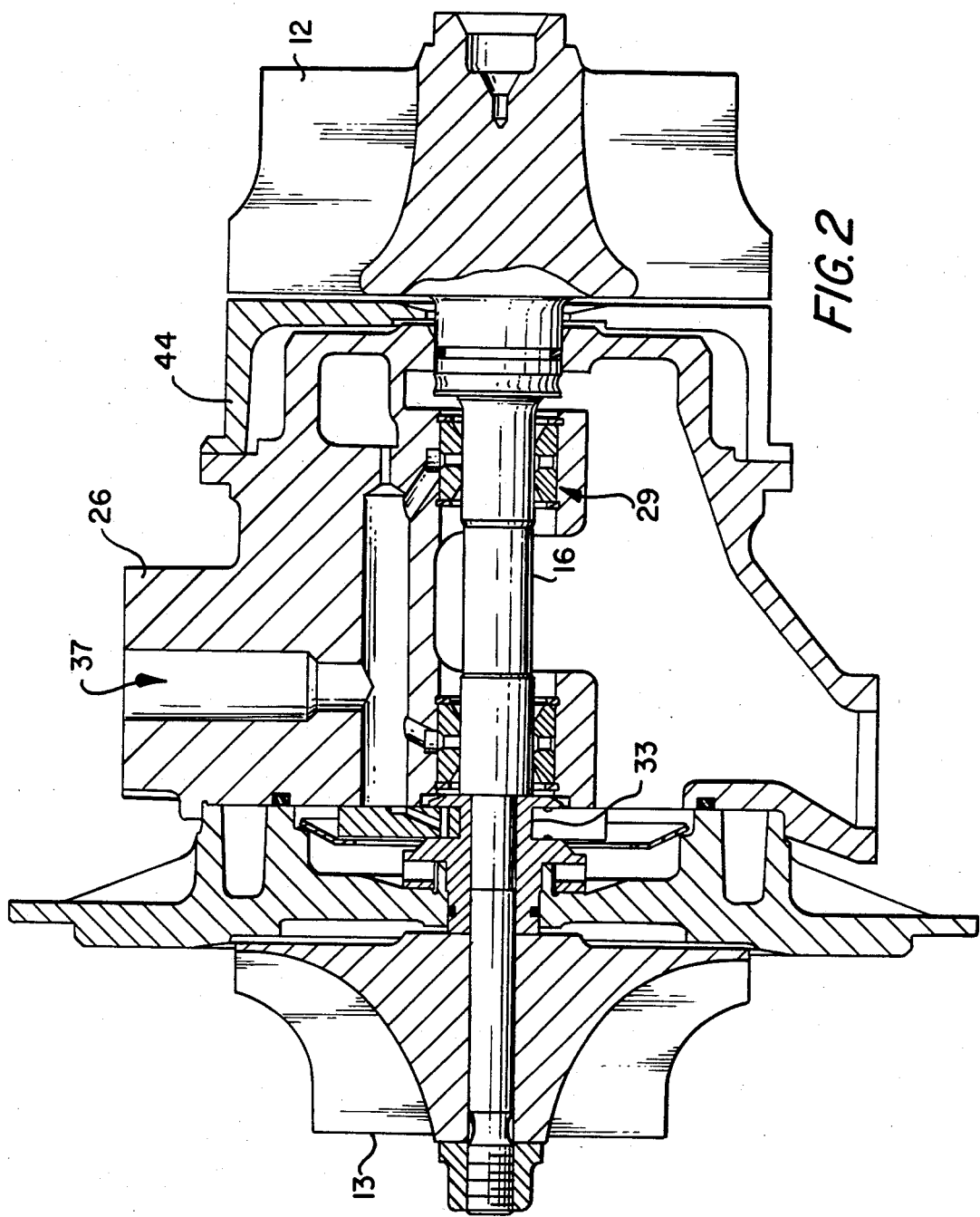
FIG. 2 is a sectional view of the internal components of an exhaust gas turbocharger.

An engine system as shown in FIGS. 1-3 includes turbomachinery in the form of a turbocharger 10 generally comprising a turbine wheel 12 and a compressor impeller 13 mounted on opposite ends of a common shaft 16. The turbine wheel 12 is disposed within a turbine housing 18 which includes an inlet 20 for receiving exhaust gas from an engine 14 and an outlet 21 for discharging the exhaust gas. The turbine housing 18 guides the engine exhaust gas into communication with and expansion through the turbine wheel 12 for rotatably driving the turbine wheel. Such driving of the turbine wheel simultaneously and rotatably drives the compressor impeller 13 which is carried within a compressor housing 22. The compressor housing 22, including an inlet 23 and outlet 25 and the compressor impeller 13 cooperate to draw in and compress ambient air for supply to the intake of the engine 14.

The turbine housing 18 is mounted to a flange member 24 which in turn is mounted to center housing 26. The compressor housing 22 is mounted on the other side of the center housing 26. The center housing 26 includes a bearing means 29 for rotatably receiving and supporting the shaft 16. A thrust bearing assembly 33 is carried about the shaft adjacent the compressor housing for preventing axial excursions of the shaft 16. A heat shield 44 is positioned about the shaft 16 at the turbine end in order to insulate the center housing 26 from the harmful effects of the exhaust gas.

Lubricant such as engine oil or the like is supplied via the center housing 26 to the journal bearing means 29 and to the thrust bearing assembly 33. A lubricant inlet port 37 is formed in the center housing 26 and is adapted for connection to a suitable source of lubricant such as filtered engine oil. The port communicates with a network of internal supply passages which are formed in the center housing 26 to direct the lubricant to the appropriate bearings. The lubricant circulated to the bearings is collected in a suitable sump or drain for passage to appropriate filtering, cooling, and recirculation equipment, all in a well-known manner.

Figure 4:
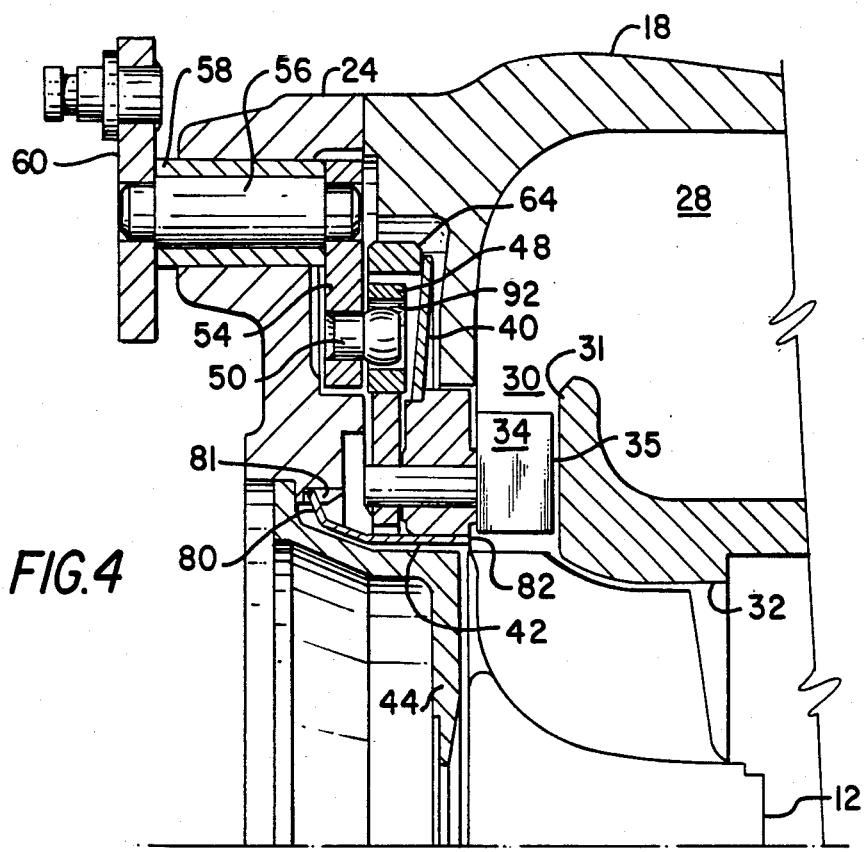
FIG. 4 is a partial sectional view of the turbine end of the turbocharger taken along line 4—4 of FIG. 3 showing the bell crank.
Figure 5:
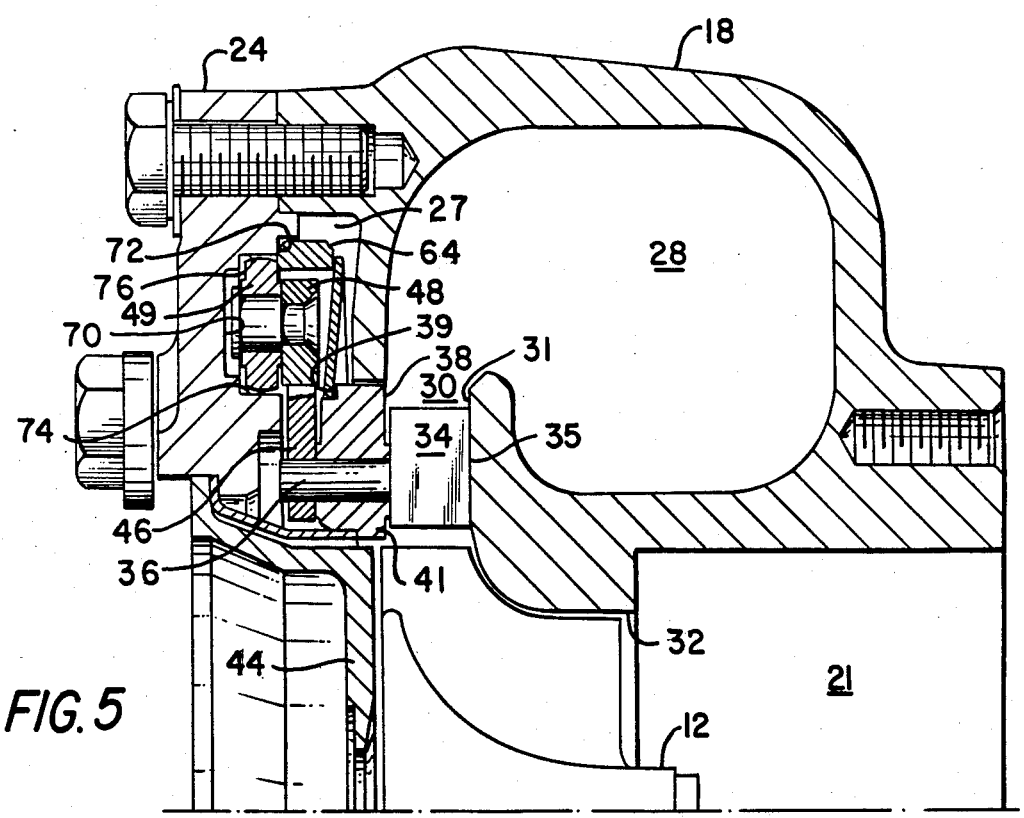
FIG. 5 is a partial sectional view of the turbine end of the turbocharger taken along line 5—5 of FIG. 3 showing the unison ring.
Figure 6:
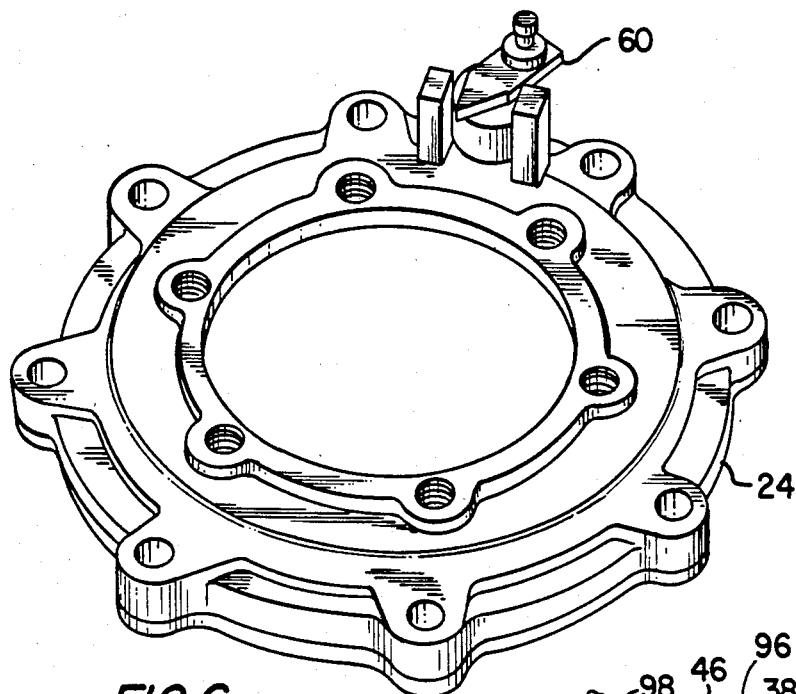
FIG. 6 is a plan view of the flange member.

As shown in FIGS. 4 and 5, the turbine housing 18 forms a generally scroll-shaped volute 28 which accepts the exhaust gas from the engine 14 and directs it onto the turbine wheel blades through an annular passage 30. Thereafter the exhaust gas flows axially through the turbine shroud 32 and exits the turbocharger through outlet 21 either into a suitable pollution-control device or the atmosphere. Placed within the annular passageway 30 are a plurality of pivotable vanes 34 which operate to vary the geometry of the annular passage 30 to control the angle at which the exhaust gas strikes the blades of the turbine wheel 12. This in turn controls the amount of energy imparted to the compressor wheel and ultimately the amount of air supplied to the engine.

The variable geometry turbine nozzle of the present invention is located within the flange and turbine housing end of turbocharger 10. The flange member 24 and the turbine housing 18 form a cavity 27 between the two in their assembled state which locates the hardware used in conjunction with the variable geometry turbine nozzle as will be described below. The exhaust gas present within volute 28 flows through the annular passageway 30 formed by the inner or side wall 31 of the turbine housing 18 and an annular nozzle ring 38. Located circumferentially around and within the annular passage 30 are a plurality of vanes 34 which are spring loaded (described in detail below) such that their tips 35 are flush against the side wall 31, see FIG. 5. FIG. 4 shows a vane tip in an unloaded position, the gap between the vane tip 35 and inner wall 31 is caused by a non-essential spacer pin (not shown) as will be discussed below. The plurality of vanes is mounted to the nozzle ring 38 having a plurality of equally spaced radial bores therethrough to accommodate a vane pin 36 associated with each vane 34. Attached to the other end of each vane pin is a vane arm 46, the shape of which can be best seen in FIG. 3. The arm is attached to the vane pin 36 by burn down process thereby rotatably attaching the vanes 34 to the nozzle ring 38 such that the nozzle ring is between the vane and vane arm. However, any suitable method of attachment can be used.

Unison ring 48 is an annular ring with a plurality of slots 51 on its inner radial surface. Each slot receives a vane arm 46. Attached to one side of the unison ring 48 are at least three equally spaced rollers 49. These roller 49 provide for ease of rotation of the unison ring 48 relative to the flange member 24. The shape of the vane arms 46 must be such as to maintain basically a rolling action within slots 51 to avoid binding within unison ring 48 as it rotates. Furthermore, the nozzle ring 38 includes a shoulder portion 39 located on its outer radial surface, and a second shoulder portion 41 on its inner radial surface. Between the nozzle ring and the turbine housing is a radial clearance of approximately 0.010 to 0.020 inches.

Flange member 24 includes a recessed portion 70 and a shoulder 72. The recessed portion includes inner and outer tracks 74 and 76 respectively formed in the inner and outer surfaces of the recess such that the two tracks are aligned axially, spaced radially apart, and face one another. During start up or low load operation (i.e. periods of relatively low exhaust gas temperature), the rollers 49 of the unison ring 48 are in contact with the inner track 74. However, as the unison ring 48 expands with increased operating temperatures the expansion causes the rollers 49 to lose contact with inner track 74 and come into engagement with outer ring 76. This design feature prevents the unison ring 48 from becoming free floating, misaligned and possibly binding within the flange member under cyclic operating conditions.

Within the should portion 72 of the flange member 24 is placed an annular spacer 64. The spacer 64 acts in cooperation with a bellville spring 40. The inboard side (that side facing the center housing) of the radially outer edge of spring 40 rests against the spacer 64, and when assembled the outboard side of the radially inner edge of the spring acts against the shoulder portion 39 of nozzle ring 38 such that it biases the nozzle ring 38 and therefore the vanes 34 into contact with side wall 31.

Tube member 42 is generally cylindrically shaped with an annular bend therein. Tube member 42 is sized so that it is slidably engageable within the inner radial surface of the nozzle ring 38. However, shoulder 41 limits this insertion and therefore together with the tube member 42 defines the length of axial travel of the nozzle ring. One end of the tube member 42 has a tab 80 which is registerable within slots 81 formed in flange members 24, and the other end has a tab 82 which is registerable within slot 83 of shoulder portion 41 of nozzle ring 38 (see FIG. 7). The tube member 42 performs several important functions in that it prevents the nozzle ring 38 from rotating, and it limits the axial and radial travel of the nozzle ring 38. During use, the circumferential edge of tube member 42 also defines the limit of radial travel of the nozzle ring 38, thereby preventing binding of the nozzle ring 38 within the turbine housing. In addition, the tube member 42 acts as a seal in the event any exhaust gas leaks behind the nozzle ring 38 and into the cavity 27 formed between the flange 24 and the turbine housing 18, thereby sealing the turbine housing 18 from the center housing 26.

In order to rotate the unison ring 48 between its two extreme positions which correspond to the limits of the geometry of the annular passage 30, a bell crank system is used. A pin 50 is rigidly connected to a first linkage member 54 at one end thereof. The pin 50 fits within a corresponding bore 92 within the unison ring 48 in order to transmit any movement in the bell crank to the unison ring 48. The first linkage member 54 is rigidly connected at its other end to a rod member 56. The rod 56 projects through a bore 57 in the flange member 24 to a point outside the turbocharger assembly. Bushing 58 is used in association with rod 56. The rod 56 is rigidly connected at its other end to a second linkage member 60 which in turn is connected to an actuator 90, shown in FIG. 1. The actuator shown is a vacuum boost type which is well known in the art. Furthermore, it is envisioned that other actuator means can be used to control the movement of the vanes.

During operation, movement of the second linkage member 60 is translated into movement of the first linkage member 54 via rod 56. The existence of pin 50 will translate any movement of the first linkage member 54 into rotational movement of unison ring 48. In turn, vane arms 46 roll against the side wall of slots 51 to pivot vanes 34 while nozzle ring 38 remains stationary. Thus there is a change in the geometry of the plurality of passageways formed between adjacent vanes.

Furthermore, thermal cycling can cause axial growth of the vanes, which if not spring loaded could become bound between the nozzle ring and the side wall 31 and thus prevent their rotation. The axial growth is accommodated through the use of spring 40 which generally keeps the vane tips 35 in a sealed relationship with side wall 31. Any radial expansion of the nozzle ring is accommodated for in the design of the turbine housing.

Figure 8:
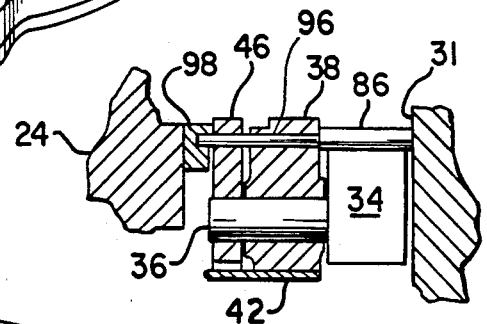
FIG. 8 is a partial sectional view detailing another type of spacer pin within the scope of the invention.
Figure 7:
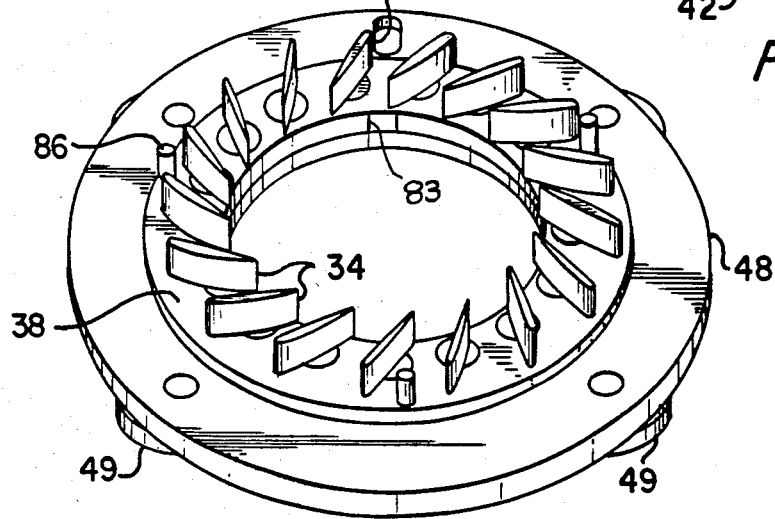
FIG. 7 is a plan view of the nozzle ring detailing several alternative embodiments of the spacer pins.
Figure 9:
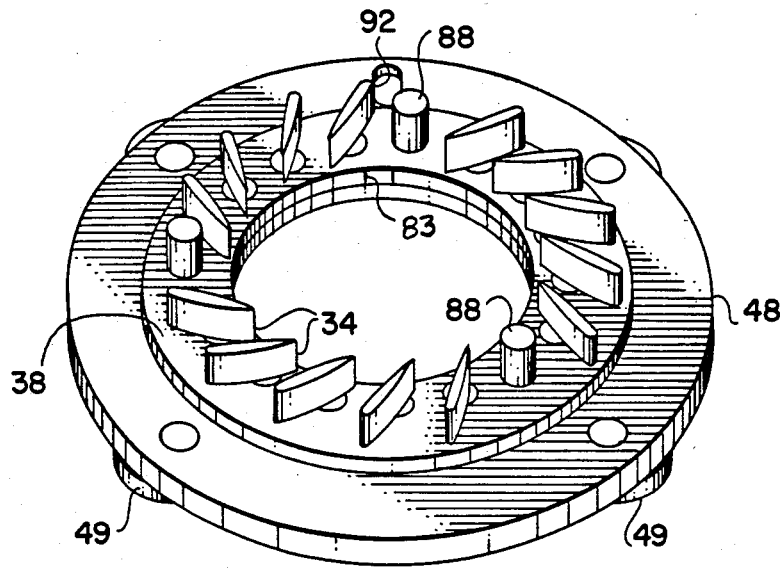
FIG. 9 is a plan view of the nozzle ring detailing an alternative embodiment of the spacer pin.
Figure 10:
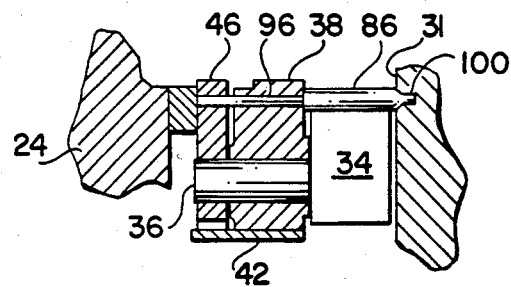
FIG. 10 is a partial section view detailing the vane extension of the spacer pin.

FIG. 7 shows an alternative feature which can be used with the present invention. Shown is a cylindrical spacer 86. Spacer 86 is located at the periphery of the plurlaity of vanes and sized such that it has a slightly longer axial length than that of the vanes. Spacer 86 is press fitted within a bore formed in the nozzle ring 38 though any method of securing the spacer can be used. Spacers of another type 88 are also shown in FIG. 9. This type of spacer is used instead of at least three vanes and operates to define the minimum space between the nozzle ring 38 and the inner wall 31. Either of these two spacers can have a vane extension 100 of reduced diameter which projects into a bore formed within the side wall 31. These extensions would prevent rotation of the nozzle ring and would therefore eliminate the need for tab 82 on the tube member 42. Furthermore, either of the two spacers can also have an extension 96 which projects through the nozzle ring into a slot 98 in the flange member, see FIG. 8. A slot is necessary in order to accommodate any radial thermal growth of the nozzle ring during operation.

Various modifications to the depicted and described apparatus will be apparent to those skilled in the art. Accordingly, the foregoing detailed description of the preferred embodiment of the invention should be considered exemplary in nature, and not as limiting to the scope and spirit of the invention as set forth in the appended claims. For example, it is envisioned that the flange member can be part and parcel of the center housing.

Having described the invention with sufficient clarity that those skilled in the art may practice it,

We claim:

1. In association with an engine, a turbocharger for supplying compressed air to said engine comprising:
    an exhaust gas driven turbine rotatably mounted to a shaft and having a compressor impeller thereon;
    a compressor housing having an inlet and an outlet and enclosing said compressor impeller;
    a center housing including bearing means for rotatably supporting the shaft;
    a turbine housing including an inlet and an outlet, said turbine housing forming a volute therein for directing exhaust gas from said engine thorugh an annular passage to said turbine;
    a flange member mounted between said center housing and said turbine housing and having a recess therein defining a radially inner and outer surface, said surfaces being aligned axially, spaced radially apart and facing each other;
    a generally annularly shaped unison ring having a plurality of slots therein and at least three equally spaced roller members rotatably mounted thereto, said rollers engageable with said inner surface during periods of relatively low exhaust gas temperature and engageable with said outer surface during periods of relatively high exhaust gas temperatures;
    a generally annular nozzle ring having a plurality of vanes pivotably mounted thereo, each of said vanes having a vane arm which is engageable within a slot in said unison ring;
    a spring means for biasing said plurality of vanes against the turbine housing; and
    means for preventing rotation of said nozzle ring.

2. The turbocharger according to claim 1 wherein the means for preventing rotation of the nozzle ring comprises at least three equally spaced spacer pins mounted to the nozzle ring at the periphery of said vanes, each spacer pin having an extension which is matable within a bore formed in the turbine housing which defines the annular passage.

3. The turbocharger according to claim 1 wherein the means for preventing rotation of the nozzle ring comprises at least three equally spaced spacer pins mounted to the nozzle ring, each spacer pin having an extension which projects through the nozzle ring into a slot formed in the flange member.

4. The turbocharger according to claim 1 further including an annular spacer means for biasing the spring means against said nozzle ring.

5. A turbocharger in connection with an engine for supplying compressed air to said engine comprising:
    an exhaust gas driven turbine rotatably mounted to a shaft having a compressor impeller thereon;
    a turbine housing forming a volute therein for directing exhaust gas from said engine through an annular passage, formed in part by said turbine housing, to said turbine;
    a flange member having a cavity therein mounted to the turbine housing;
    means for varying the gas flow area of said annular passage including a spring loaded nozzle ring defining one boundary of said annular passage and having a plurality of vanes pivotably mounted thereto such that said vanes are spring loaded against the part of the turbine housing forming said annular passage, and means to pivot the plurality of vanes; and
    means for preventing rotation of the nozzle ring wherein said means for preventing rotation includes a generally cylindrical tube member having a tab at each end thereof, one of said tabs being indexable within a slot in said flange member, the other tab being indexable within a slot in said nozzle ring.

6. The turbocharger according to claim 5 further including at least three equally spaced pins mounted to the nozzle ring.

7. The turbocharger according to claim 6 wherein said spacer pins have an axial length greater than that of each vane.

8. The turbocharger according to claim 6 wherein said spacer pins are mounted at the periphery of said plurality of vanes.

9. The turbocharger according to claim 6 wherein each of said spacer pins replaces a single vane.

10. In combination with a engine, a turbocharger comprising:
    an exhaust gas driven turbine rotatably mounted to a shaft having a compressor impeller thereon;
    a compressor housing enclosing said compressor impeller;
    a center housing including bearing means for rotatably supporting the shaft;
    a turbine housing forming a volute therein for directing exhaust gas from said engine through an annular passage to said turbine;
    a flange member mounted between said center housing and said turbine housing and having a cavity therein;
    a spring loaded nozzle ring defining one boundary of said annular passage and having a plurality of vanes pivotably mounted thereto, said nozzle ring spring loading said vanes against the turbine housing;

means to pivot the plurality of vanes including a vane pin associated with each pivotable vane rotatably mounted through said nozzle ring, a vane arm rigidly attached to the vane pin such that the nozzle ring is located between the vane and the vane arm, an annular unison ring having a plurality of slots for receiving the vane arm therein, said unison ring having at least two roller members rotatably attached to the unison ring, and a linkage means responsive to an actuator means for rotating the unison ring; and means for preventing the unison ring from becoming skewed within the flange member including a recess formed in the flange member which defines radially inner and outer surfaces, said surfaces are aligned axially, spaced radially apart and face one another, and at least three equally spaced rollers rotatably mounted to said unison ring, said rollers engageable in said inner surface ring of relatively low exhaust gas temperature and engageable with said outer surface during periods of relatively high exhaust gas temperatures.

11. The turbocharger according to claim 10 wherein the linkage means includes a pin means engageable within a bore in the unison ring and attached to a first linkage member, said first linkage member rigidly connected to a rod member rotatable about its axis and having a second linkage member attached to the other end, and actuator means attached to the second linkage member for rotating the second linkage member about the rod member.

12. The turbocharger according to claim 11 wherein the rod member extends through a bore in the flange member to a point outside of the flange member and includes a bushing therearound.

13. The turbocharger according to claim 10 further including means for preventing rotation of said nozzle ring.

14. The turbocharger according to claim 13 wherein said means for preventing rotation of the nozzle ring comprises a generally cylindrical tube member having a projecting tab at each end thereof, one of said tabs being indexable within a slot in said flange member, the other being indexable within a slot in said nozzle ring.

15. The turbocharger according to claim 13 further including at least three equally spaced spacer pins mounted to the nozzle ring.

16. The turbocharger according to claim 15 wherein said spacer pins have an axial length greater than that of each vane.

17. The turbocharger according to claim 15 wherein the spacer pins are mounted at the periphery of said plurality of vanes.

18. The turbocharger according to claim 13 wherein said means for preventing rotation of said nozzle ring comprises at least three equally spaced spacer pins mounted to the nozzle ring, each of said spacer pins having a vane extension which is matable within a bore formed in the turbine housing which defines the annular passage.

19. The turbocharger according to claim 18 wherein said spacer pins are mounted at the periphery of said plurality of vanes.

20. The turbocharger according to claim 18 wherein each spacer pins replaces a single vane.

21. The turbocharger according to claim 13 wherein said means for preventing rotation of said nozzle ring comprises at least three equally spaced spacer pins mounted to the nozzle ring, each of said spacer pins having an extension which extends through the nozzle ring to a slot formed in said flange member.

22. In association with an engine, a turbocharger for supplying compressed air to said engine comprising:
an exhaust gas driven turbocharger rotatably mounted to a shaft and having a compressor impeller thereon;
a compressor housing having an inlet and an outlet and enclosing said compressor impeller;
a center housing including bearing means for rotatably supporting the shaft;
a turbine housing including inlet and outlet, said turbine housing forming a volute therein for directing exhaust gas from said engine through an annular passage to said turbine;
a flange member mounted between said center housing and said turbine housing and having a recess therein defining a radially inner and outer surface, said surfaces being aligned axially, spaced radially apart and facing each other;
a generally annularly shaped unison ring having a plurality of slots therein and at least three equally spaced roller members rotatably mounted thereto;
a generally annular nozzle ring having a plurality of vanes pivotably mounted thereto, each of said vanes having a vane arm which is engageable within a slot in said unison ring
a spring means for biasing said plurality of vanes against the turbine housing; and
means for preventing rotation of said nozzle ring comprising a generally cylindrical tube member having a projecting tab at each end thereof, one of said tabs being indexable within a slot in said flange member, the other being indexable within a slot in said nozzle ring.

23. The turbocharger according to claim 22 further including at least three equally spaced spacer pins mounted to the nozzle ring.

24. The turbocharger according to claim 23 wherein said spacer pins have an axial length greater than that of each vane.

25. The turbocharger according to claim 23 wherein said spacer pins are mounted at the periphery of said plurality of vanes.

26. The turbocharger according to claim 23 wherein each of said spacer pins replaces a single vane.

* * * * *